May 11, 1937.   D. W. EVERETT   2,080,120
METHOD AND MEANS FOR COOLING A LIGHT PROJECTOR
AND THE BEAM PRODUCED THEREBY
Filed Dec. 28, 1934

INVENTOR
David W. Everett
BY
Philip A. Friedell
ATTORNEY

Patented May 11, 1937

2,080,120

UNITED STATES PATENT OFFICE 2,080,120

METHOD AND MEANS FOR COOLING A LIGHT PROJECTOR AND THE BEAM PRODUCED THEREBY

David W. Everett, San Francisco, Calif.

Application December 28, 1934, Serial No. 759,541

8 Claims. (Cl. 240—47)

This invention, a method and means for cooling a light projector and the beam produced thereby, consists of a method and apparatus used in conjunction therewith, which filters the heat from combinations of light and heat rays in various types of illuminating devices, such as searchlights, spotlights, floodlights, "Klieg" lights, and other types of beam creators and illuminating devices of high illuminating power.

One of the major problems of the moving picture industry resides in illumination, since intense light is required in the illumination of the subject being filmed under artificial light conditions, the heat in such cases being usually so intense within the beam as to sometimes cause ignition of readily combustible materials, and readily melts the usual grease paint employed in the makeup of certain characters, and due to both the intense heat and its distressing effect and the spoiling of the makeup, as well as the danger of fire, frequent interruptions in the filming of a scene is necessitated.

Also, heat radiated from the lamp housing is distressful to the directors, lamp men, and others who are required to be at times in close proximity to such lamps. The lamp housings become too hot to permit handling with the bare hands, and the lamp adjusters therefore are compelled to work under very trying conditions.

This invention removes practically all heat from the beam, and maintains the lamp housing substantially cool, by filtering the major portion of the heat from the rays within the lamp, and also maintains the lamp housing in a sufficiently cool state to permit direct handling and adjustment without inconvenience or discomfort, and due to the fact that little heat is projected in the light beam, filming of a scene may be carried through without interruption, so far as heat and the spoiling of make-up is concerned.

The main object of the invention therefore, is to provide means for filtering the heat rays from light rays in projection illumination.

Another object of the invention is to provide means for maintaining the lamp housing cool, so that it may be conveniently handled and adjusted.

A further object of the invention is to provide a heat filter between a source of illumination and an object illuminated, without appreciably decreasing the intensity of illumination.

Other objects and advantages of the invention will become apparent as the following description is read on the drawing forming a part of this specification, and in which similar reference characters are used to designate similar parts throughout the several views, of which;

The invention consists of a method of filtering heat rays from light rays by passing the light rays successively through a series of transparent compartments comprising evacuated compartments, static air compartments, and constant flow, air-circulating compartments.

Figure 4:
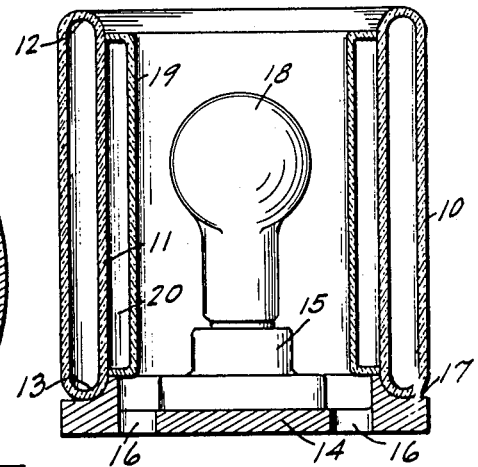
Fig. 4 is a modification of the invention for use with any type of illumination.

The apparatus suitable for this method for non-projection purposes or ordinary illumination, is shown in Fig. 4, and consists of an evacuated cylindrical shell consisting of an outer cylindrical wall 10 and an inner cylindrical wall 11, sealed together at the top and bottom as indicated at 12 and 13, the space between the walls being evacuated.

A base 14 on which the lamp base or socket 15 is secured has air circulating passages 16 formed therethrough, and also has a seat 17 on which the evacuated cylindrical shell rests, although any other suitable type of mounting may be used.

The air, due to heating through the medium of the lamp 18, circulates upwardly through ports 16, between the lamp 18 and wall 11, and out through the top of the cylindrical shell, this being the simplest form of the invention.

The cylindrical shell is formed of heat-resistant glass, or quartz, according to the degree of heat it must withstand, and is evacuated to the highest degree commercially practical, and since heat cannot be conducted through a perfect vacuum, the amount of heat passing to the outer wall of the shell will be practically negligible, under ordinary heat conditions.

When the heat from the lamp 18 is very intense, a second cylinder 19, outwardly flanged at both ends fits within the wall 11 and forms a dead or static air space 20. With this arrangement, heat rays from the lamp are partly removed by the circulating air within the inner cylinder, more heat rays are blocked by the dead air space and carried away by the circulating air, and that passing through the inner cylinder is blocked by the vacuum in the cylindrical shell, and this in turn raises the temperature of the inner cylinder, under which conditions the circulating air removes the heat at a higher rate.

The most essential element of the invention resides in an evacuated transparent cell or lens through which the light rays are projected to form the beam, and is shown in a variety of lens forms, the various forms being modified for the particular type or form of light projection desired.

Figure 1:
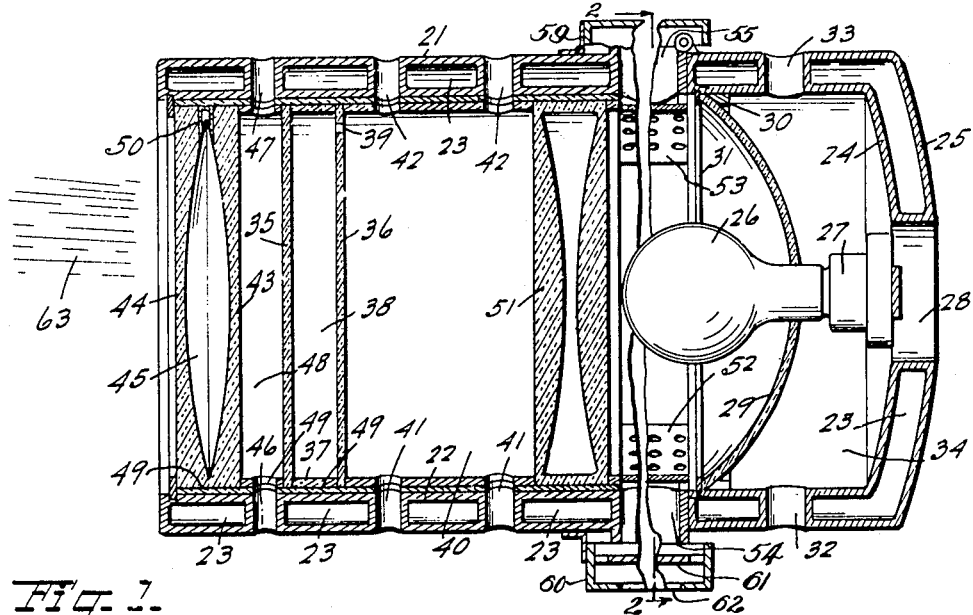
Fig. 1 is a longitudinal sectional elevation through a projector particularly adapted to high intensity illumination.
Figure 2:
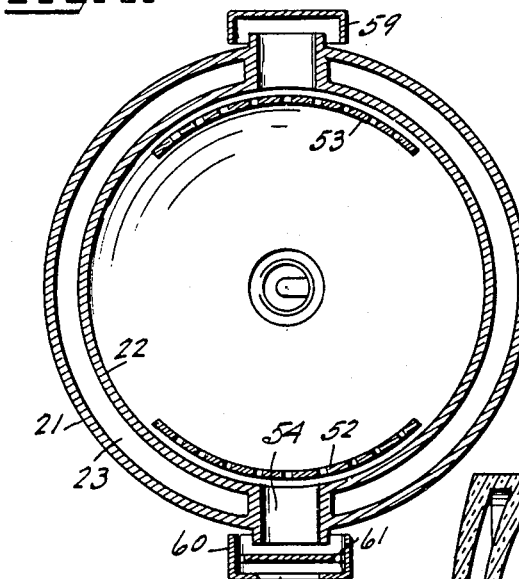
Fig. 2 is a section taken on line 2—2 of Fig. 1 modified by the addition of air entry and exit hoods.

For projection purposes, such as for searchlights, studio lighting for moving picture sets and photographic studios and similar purposes, the projector illustrated in Fig. 1 is very efficient in filtering heat rays from the light rays before projection to form the beam, and in keeping the exterior of the housing cool to permit convenient handling and adjustment, and is therefore particularly desirable for motion picture work.

The housing is divided into a cylindrical front section and a rear section, hinged together, the front section having outside walls 21 and inner walls 22, the space between the walls forming vacuum chambers 23 which are evacuated to a high degree.

The rear section is similarly formed except that end walls 24 and 25 form the back of the rear section and vacuum chambers 23 are similarly formed therein.

The lamp 26 may be mounted in any customary manner, and is shown as projecting forwardly, with the base 27 mounted over an opening 28 formed through the rear wall 24—25, to permit circulation about the lamp socket or base.

The reflector 29 is mounted against an annular shoulder 30 fixed in the rear section, and retained in position by means of a spring ring 31 which is resiliently retained in a groove as shown.

Lower and upper circulating apertures 32 and 33 are formed diametrically through the rear section, between the back 24—25 and the reflector 29. Thus, a current of air constantly flows through the circulating air chamber 34, over the rear face of the reflector 29 and about the lamp base and out through the port 33, air coincidently passing through the passage 28 and keeping the lamp socket cool.

Mounted in the front section in spaced relation to the lamp 26 is a dead or static-air baffle consisting of two spaced apart flat plates 35 and 36 having their inner faces highly polished, the plates being annularly sealed and spaced apart by means of heat-insulating material 37, forming a dead- or static-air chamber 38, and vents 39 are provided for expansion and contraction of the air.

A circulating air chamber 40 is formed between the reflector 29 and static-air chamber rear plate 36, and diametric circulating apertures 41 and 42 are formed through the bottom and top walls respectively, to form through passages, whereby cool air is constantly admitted through the lower apertures, absorbing heat in the chamber, and passing out through the upper passages.

Mounted in advance of the dead-air-chamber wall 35 and in spaced relation thereto, is a vacuum lens consisting of an inner wall 43 and outer wall 44, the chamber 45 formed therein being evacuated, and this lens may be formed in any combination of plane, concave, or convex, that shown being a plano-concave-concavo-plano type.

Air circulating apertures 46 and 47 are diametrically formed through the walls of the housing between the dead-air chamber and vacuum lens to permit circulation of air through the circulating air chamber 48 formed between the elements 35 and 43, and the static air baffle and vacuum lens are suitably secured in position with heat insulating material 49 interposed between the edges of the plates and between the plates, lens and the housing.

The lenses, such as elements 43—44 may be individually ground, sealed together at the periphery by cementing or fusion, evacuated and sealed off as indicated at 50, the evacuating teat being fused or cemented in a passage formed between the cooperating faces of the elements, and being fused or cemented in place coincidently with cementation or fusion of the edges of the lens elements.

For filtering moderate amounts of heat, the static air baffle may be omitted, however, the static-air baffle forms a heat baffle to protect the vacuum lens against excessive heat, since the vacuum lens would be more expensive to construct than the static air baffle, unless the vacuum lens were merely blown to shape with the vacuum chamber formed therein, however, for high efficiency in filtration, the plane surface of element 43, and concave surface of element 44 should be ground and polished.

In cases of intense heat, or for correction of the beam for specific projection, a vacuum lens 51 may be interposed between the lamp and the static air baffle, a plano-convex-convexo-plane lens being shown in this position to illustrate the possibility of correction in conjunction with a lens of different characteristics or form, shown at the front of the housing.

In the circulating-air compartment between the lens 51 and the reflector 29, distributing baffles 52 and 53 are shown for distributing the air entering port 54 and leaving port 55, these baffles having a multiplicity of apertures directing the air currents throughout the entire area of the chamber, obviating eddies, or dead spots.

Figure 3:
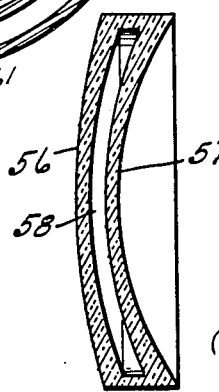
Fig. 3 is a modification of the vacuum lens shown in section.

Fig. 3 shows another modification of the vacuum lens consisting of two convexo-concave elements 56 and 57 with interposed vacuum chamber 58.

The distributing baffles 52—53 may be used in connection with any of the circulating air passages, although only shown in connection with one pair. This baffle distributes the air flow and more effectively scavenges the compartment of heated air.

Suitable hoods, 59 or 60 may be provided, when desired, over the passages, the hood 60 having a baffle 61 and an axial air passage 62, which permits air to flow in two directions for entry.

In the simplest form of the invention, the light rays are first projected through a flowing current of air to carry away heat, and a vacuum lens blocks the heat rays while permitting unobstructed passage of light.

The interposed static-air baffle is economically constructed, is quite effective in filtering out the heat waves, and thus protects the vacuum lens against excessive heat on its inner face.

In this arrangement, part of the heat is removed from the lamp chamber by flowing air currents, a portion of the heat is blocked by the static-air baffle or dead-air space, and that passing through the static-air baffle is blocked by the vacuum lens and removed by flowing air currents in the interposed circulating air chamber, this considerably cooling the beam of light. The highly polished inner faces of the various lens elements are also effective in blocking the radiated heat, and between the combination of circulating air chambers, static air baffle, vacuum lens, and polished reactive faces, high filtering efficiency is secured.

The exterior of the housing is maintained suitably cool due to the vacuum chamber formed between the walls thereof, which is non-conductive in proportion to the degree of vacuum.

The beam 63, due to previous filtering out of a substantial amount of the heat, may be broadly considered as a cold beam, when considered relative to the ordinary beam as projected from existing types of lamps.

It will be understood that variations in the method, and in the construction, form, and arrangement of parts, which variations are consistent with the appended claims, may be resorted to, without detracting from the spirit or scope of the invention, or sacrificing any of the advantages thereof.

I claim:

1. A projection illuminating device, in combination, a housing having evacuated chambers formed in the walls thereof, a source of illumination, a vacuum lens having an evacuated chamber formed therein, diametric passages formed through the walls of the housing between the lens and the source of illumination forming a circulating air chamber therebetween, and a static air baffle having a static-air chamber formed therein and interposed in spaced relation between the vacuum lens and the source of illumination and forming a second circulating air chamber between the lens and baffle, and intake and discharge passages therefor formed diametrically through the walls of the housing.

2. A projection illuminating device, in combination, a housing having evacuated chambers formed in the walls thereof, a source of illumination, a vacuum lens having an evacuated chamber formed therein, diametric passages formed through the walls of the housing between the lens and the source of illumination forming a circulating air chamber therebetween, and air distributing baffles mounted interiorly of the housing in cooperative relation to the passages.

3. A heat filter comprising in combination with a source of illumination and mounting means therefor, a housing having evacuated chambers formed in the walls thereof, and diametric air passages formed therethrough, a vacuum lens having an evacuated chamber formed therein, and an air passage formed through the walls of the housing to permit circulation of air about the mounting means.

4. A projection illuminating device comprising a double-walled, cylindrical enclosure having a completely enclosing evacuated chamber formed between the walls including both ends, the walls of one end being formed of transparent material for the passage of light, a lamp mounted in the other end, and passages formed diametrically through the walls in a vertical plane between the ends to permit circulation of air within the enclosure.

5. A projection illuminating device comprising a double-walled, cylindrical enclosure having evacuated chambers formed within the walls thereof including both ends, the walls of one end being formed of transparent material for the passage of light, a lamp mounted at the other end, passages formed diametrically through the walls in a vertical plane between the ends to permit circulation of air through the enclosure, and a static air baffle interposed between the ends and having a static air chamber formed therein, and dividing the enclosure into two circulating air chambers.

6. A projection illuminating device comprising a double-walled, cylindrical enclosure having evacuated chambers formed within the walls thereof including both ends, the walls of one end being formed of transparent material for the passage of light, a lamp mounted in the other end, passages formed diametrically through the walls in a vertical plane between the ends to permit circulation of air through the enclosure, and a static air baffle interposed between the ends and having a static air chamber formed therein, and dividing the enclosure into two circulating chambers, and being formed of two plates, said plates and the transparent walls of said one end being heat insulated from each other and from the enclosure, the lamp side of the plates and the transparent walls being highly polished to provide a reflective surface for reflecting the heat from the lamp to the respective circulating air chambers.

7. A projection lamp comprising a cylindrical housing consisting of a front section and a rear section hinged together, evacuated compartments formed in the walls of both sections including the rear end of the rear section, a reflector and a lamp mounted in the rear section and an air circulating aperture for the base of the lamp, the lamp projecting through the reflector, and a vacuum lens having an evacuated chamber formed therein and mounted in the front end of the front section, and longitudinally spaced apart diametric, vertically aligned air passages formed through the walls of the housing forming a circulating air chamber between the lens and the lamp.

8. A projection lamp comprising a cylindrical enclosure consisting of a front section and a rear section hinged together, evacuated compartments formed in the walls of both sections including the rear end of the rear section, a reflector and a lamp mounted in the rear section and an air circulating aperture for the base of the lamp, the lamp projecting through the reflector, and a vacuum lens having an evacuated chamber formed therein and mounted in the front end of the front section, and longitudinally spaced apart diametrically related, vertically aligned air passages formed through the walls of the enclosure forming a circulating air chamber between the lens and the lamp, and a static-air baffle comprising spaced apart transparent elements, interposed between the lamp and the vacuum lens and in spaced relation to both lens and lamp, forming a protecting baffle, and dividing the circulating air chamber into two individually operative sections.

DAVID W. EVERETT.